(12) United States Patent
Alizadeh-Shabdiz et al.

(10) Patent No.: US 7,551,579 B2
(45) Date of Patent: Jun. 23, 2009

(54) CALCULATION OF QUALITY OF WLAN ACCESS POINT CHARACTERIZATION FOR USE IN A WLAN POSITIONING SYSTEM

(75) Inventors: Farshid Alizadeh-Shabdiz, Wayland, MA (US); Kaveh Pahlavan, Newton, MA (US); Nicolas Brachet, Chestnut Hill, MA (US)

(73) Assignee: Skyhook Wireless, Inc., Boston, MA (US)

( * ) Notice: Subject to any disclaimer, the term of this patent is extended or adjusted under 35 U.S.C. 154(b) by 313 days.

(21) Appl. No.: 11/430,224

(22) Filed: May 8, 2006

(65) Prior Publication Data

US 2007/0258409 A1      Nov. 8, 2007

(51) Int. Cl.
*H04Q 7/00*      (2006.01)
(52) U.S. Cl. .................. 370/328; 370/338; 370/329; 370/331; 370/310
(58) Field of Classification Search ................ 370/338, 370/329, 331, 328, 310
See application file for complete search history.

(56) References Cited

U.S. PATENT DOCUMENTS

| | | | |
|---|---|---|---|
| 6,888,811 B2 | 5/2005 | Eaton et al. | |
| 7,305,245 B2 | 12/2007 | Alizadeh-Shabdiz et al. | |
| 7,403,762 B2 | 7/2008 | Morgan et al. | |
| 2005/0037775 A1 | 2/2005 | Moeglein et al. | |
| 2005/0073980 A1 | 4/2005 | Thomson et al. | |
| 2005/0192024 A1 | 9/2005 | Sheynblat | |
| 2005/0208919 A1* | 9/2005 | Walker et al. ............... | 455/296 |
| 2006/0009235 A1 | 1/2006 | Sheynblat et al. | |
| 2006/0072502 A1 | 4/2006 | Crandall et al. | |
| 2006/0095348 A1 | 5/2006 | Jones et al. | |
| 2006/0095349 A1 | 5/2006 | Morgan et al. | |
| 2006/0106850 A1 | 5/2006 | Morgan et al. | |
| 2006/0200843 A1 | 9/2006 | Morgan et al. | |
| 2006/0217131 A1 | 9/2006 | Alizadeh-Shabdiz et al. | |
| 2006/0240840 A1 | 10/2006 | Morgan et al. | |
| 2007/0004427 A1 | 1/2007 | Morgan et al. | |

(Continued)

OTHER PUBLICATIONS

U.S. Appl. No. 11/261,848, filed Oct. 25, 2005, Morgan et al.

(Continued)

*Primary Examiner*—Vincent P Harper
*Assistant Examiner*—Fred A Casca
(74) *Attorney, Agent, or Firm*—Wilmer Cutler Pickering Hale & Dorr LLP (57) ABSTRACT

Methods and systems for classifying WLAN access points according to the quality of estimation of characteristics of the WLAN access points are provided. The classifications may be used to scale a reference database and quantify an expected error of estimation of the characteristics of the access points. WLAN access points may be classified based on their impact on a user's position, speed of travel, and direction of travel estimation accuracy in a WLAN positioning system. A method for determining a quality of estimation of characteristics of a Wi-Fi access point comprises a Wi-Fi enabled scanning device measuring a number of received signal strength (RSS) samples of the Wi-Fi signal transmitted by the Wi-Fi access point. A total distance traveled by the Wi-Fi enabled scanning device while measuring the number of RSS samples is estimated and used to estimate the quality of estimation of characteristics of the Wi-Fi access point.

4 Claims, 4 Drawing Sheets

U.S. PATENT DOCUMENTS

| | | | |
|---|---|---|---|
| 2007/0004428 A1* | 1/2007 | Morgan et al. | 455/456.1 |
| 2007/0126635 A1 | 6/2007 | Houri | |
| 2007/0258408 A1 | 11/2007 | Alizadeh-Shabdiz et al. | |
| 2007/0258409 A1 | 11/2007 | Alizadeh-Shabciz et al. | |
| 2007/0258420 A1 | 11/2007 | Alizadeh-Shabdiz et al. | |
| 2007/0258421 A1 | 11/2007 | Alizadeh-Shabdiz et al. | |
| 2007/0259624 A1 | 11/2007 | Alizadeh-Shabdiz et al. | |
| 2008/0008117 A1 | 1/2008 | Alizadeh-Shabdiz | |
| 2008/0008118 A1 | 1/2008 | Alizadeh-Shabdiz | |
| 2008/0008119 A1 | 1/2008 | Alizadeh-Shabdiz | |
| 2008/0008120 A1 | 1/2008 | Alizadeh-Shabdiz | |
| 2008/0008121 A1 | 1/2008 | Alizadeh-Shabdiz | |
| 2008/0033646 A1 | 2/2008 | Morgan et al. | |
| 2008/0108371 A1 | 5/2008 | Alizadeh-Shabdiz et al. | |
| 2008/0132170 A1 | 6/2008 | Alizadeh-Shabdiz et al. | |
| 2008/0139217 A1 | 6/2008 | Alizadeh-Shabdiz et al. | |
| 2008/0176583 A1 | 7/2008 | Brachet et al. | |
| 2008/0248741 A1 | 10/2008 | Alizadeh-Shabdiz | |
| 2008/0248808 A1 | 10/2008 | Alizadeh-Shabdiz | |

OTHER PUBLICATIONS

U.S. Appl. No. 11/359,154, filed Feb. 22, 2006, Morgan et al.
U.S. Appl. No. 11/359,144, filed Feb. 22, 2006, Morgan et al.
U.S. Appl. No. 11/359,271, filed Feb. 22, 2006, Morgan et al.
U.S. Appl. No. 11/430,079, filed May 8, 2006, Alizadeh-Shabdiz et al.
U.S. Appl. No. 11/430,224, filed May 8, 2006, Alizadeh-Shabciz et al.
U.S. Appl. No. 11/430,222, filed May 8, 2006, Alizadeh-Shabdiz et al.
U.S. Appl. No. 11/429,862, filed May 8, 2006, Alizadeh-Shabdiz et al.
U.S. Appl. No. 11/730,064, filed May 8, 2006, Alizadeh-Shabdiz et al.
"Delta Encoding", Wikipedia, retrieved from http://en.wikipedia.org/wiki/Delta_encoding, 2006.
Griswold et al., "ActiveCampus—Sustaining Educational Communities through Mobile Technology." UCSD CSE Technical Report #CS200-0714, 2002.
Hellebrandt, M., et al., "Estimating Position and Velocity of Mobile in a Cellular Radio Network," IEEE Transactions on Vehicular Technology, vol. 46, No. 1, Feb. 1997.
Hazas, M., et al., "Location-Aware Computing Comes of Age," IEEE, vol. 37, Feb. 2004.
"Huffman Coding", Wikipedia, retrieved from http://en.wikipedia.org/wiki/Huffman_coding, 2006.
Kawabata, K., "Estimating Velocity Using Diversity Reception," IEEE, 1994.
Kim, M., et al., "Risks of using AP locations discovered through war driving," Lecture Notes in Computer Science, vol. 3968, 2006.
Kirsner, S., "One more way to find yourself," The Boston Globe, May 23, 2005, Retrieved from www.boston.com.
Krumm, J., et al., "LOCADIO: Inferring Motion and Location from Wi-Fi Signal Strengths," First Annual International Conference on Mobile and Ubiquitous Systems: Networking and Services, Aug. 2004.
Kwan, M., "Graphic Programming Using Odd or Even Points," Chinese Math. 1, 1962.
LaMarca, A., et al., "Place Lab: Device Positioning Using Radio Beacons in the Wild," Intel Corporation, 2004.
Muthukrishnan, K., et al., "Towards Smart Surroundings: Enabling Techniques and Technologies for Localization," Lecture Notes in Computer Science, vol. 3479, May 2005.
"Terminal Equipment and Protocols for Telematic Services: Information Technology-Digital Compression and Coding of Continuous-Tome Still Images—Requirements and Guidelines," International Telecommunication Union, Sep. 1992.
International Search Report, International Application No. PCT/US05/39208, mailed Jan. 29, 2008. (3 pages).
International Search Report and Written Opinion, International Application No. PCT/US07/68251, mailed Aug. 25, 2008. (8 pages).

* cited by examiner

CALCULATION OF QUALITY OF WLAN ACCESS POINT CHARACTERIZATION FOR USE IN A WLAN POSITIONING SYSTEM

CROSS-REFERENCE TO RELATED APPLICATIONS

This application is related to the following U.S. Patent Applications:

U.S. Pat. application Ser. No. 11/430,079, entitled Estimation Of Speed and Direction of Travel In A WLAN Positioning System, filed May 8, 2006;

U.S. Pat. application Ser. No. 11/429,862, entitled Estimation of Speed of Travel Using the Dynamic Signal Strength Variation of Multiple WLAN Access Points, filed May 8, 2006;

U.S. Pat. application Ser. No. 11/430,064, entitled Estimation of Speed and Direction of Travel In A WLAN Positioning System Using Multiple Position Estimations, filed May 8, 2006; and U.S. Pat. application Ser. No. 11/430,222, entitled Estimation of Position Using WLAN Access Point Radio Propagation Characteristics in a WLAN Positioning System, filed May 8, 2006;

the contents of which are hereby incorporated by reference.

BACKGROUND

1. Field of the Invention

The invention generally relates to positioning systems and, more specifically, to methods and systems of classifying WLAN access points in a WLAN positioning system. The invention further relates to calculating the quality of estimation of characteristics of the WLAN access points and scaling a reference database accordingly.

2. Discussion of Related Art

Position determination is the main component of navigation systems and any Location Based Services (LBS). Proliferation of WLAN access points in recent years created a blanket of WLAN radio waves everywhere. Therefore, almost in any place, there is a great possibility of detecting WLAN radio waves, especially in urban areas. The exponential growth of WLAN, and the fact that they can be found almost everywhere, initiated an idea of leveraging them for a metropolitan positioning system for indoor and outdoor areas. In a metropolitan WLAN positioning system, location of WLAN access points are used as reference points, and the Received Signal Strength (RSS) of a WLAN access point is used as an indicator of a distance of an end user from the WLAN access points that the user detects at any time. By knowing the distance of the end user from WLAN access points, location of the end user can be determined. Translating receiver Receive Signal Strength to distance relies on assuming a specific radio channel model. Ideally, if the radio channel model was exactly known, the exact distance of the end user to WLAN access points could be found.

Outdoor and indoor WLAN based positioning systems have been explored by couple of research labs, but none of them included speed and bearing estimation in their system. The most important research efforts in this area have been conducted by PlaceLab (www.placelab.com, a project sponsored by Microsoft and Intel), University of California San Diego ActiveCampus project (ActiveCampus—Sustaining Educational Communities through Mobile Technology, technical report #CS2002-0714), and the MIT campus wide location system, and it was evaluated through several small projects at Dartmouth college (e.g., M. Kim, J. J. Fielding, and D. Kotz, "Risks of using AP locations discovered through war driving").

There have been a number of commercial offerings of Wi-Fi location systems targeted at indoor positioning. (See, e.g., Kavitha Muthukrishnan, Maria Lijding, Paul Havinga, Towards Smart Surroundings: Enabling Techniques and Technologies for Localization, *Proceedings of the International Workshop on Location and Context-Awareness* (LoCA 2005) at Pervasive 2005, May 2005, and Hazas, M., Scott, J., Krumm, J.: Location-Aware Computing Comes of Age. IEEE Computer, 37(2):95-97, February 2004 005, Pa 005, Pages 350-362.) These systems are designed to address asset and people tracking within a controlled environment like a corporate campus, a hospital facility or a shipping yard. The classic example is having a system that can monitor the exact location of the crash cart within the hospital so that when there is a cardiac arrest the hospital staff doesn't waste time locating the device. The accuracy requirements for these use cases are very demanding typically calling for 1-3 meter accuracy.

These systems use a variety of techniques to fine tune their accuracy including conducting detailed site surveys of every square foot of the campus to measure radio signal propagation. They also require a constant network connection so that the access point and the client radio can exchange synchronization information similar to how A-GPS works. While these systems are becoming more reliable for indoor use cases, they are ineffective in any wide-area deployment. It is impossible to conduct the kind of detailed site survey required across an entire city and there is no way to rely on a constant communication channel with 802.11 access points across an entire metropolitan area to the extent required by these systems. Most importantly outdoor radio propagation is fundamentally different than indoor radio propagation rendering these indoor positioning algorithms almost useless in a wide-area scenario. The required accuracy of indoor WLAN based positioning systems, makes it hard to use radio channel modeling and it is considered as a research topic in that domain. In addition, none of the WLAN based positioning systems to date have distinguished between access points, and current methods treat all WLAN access points the same.

Figure 1:
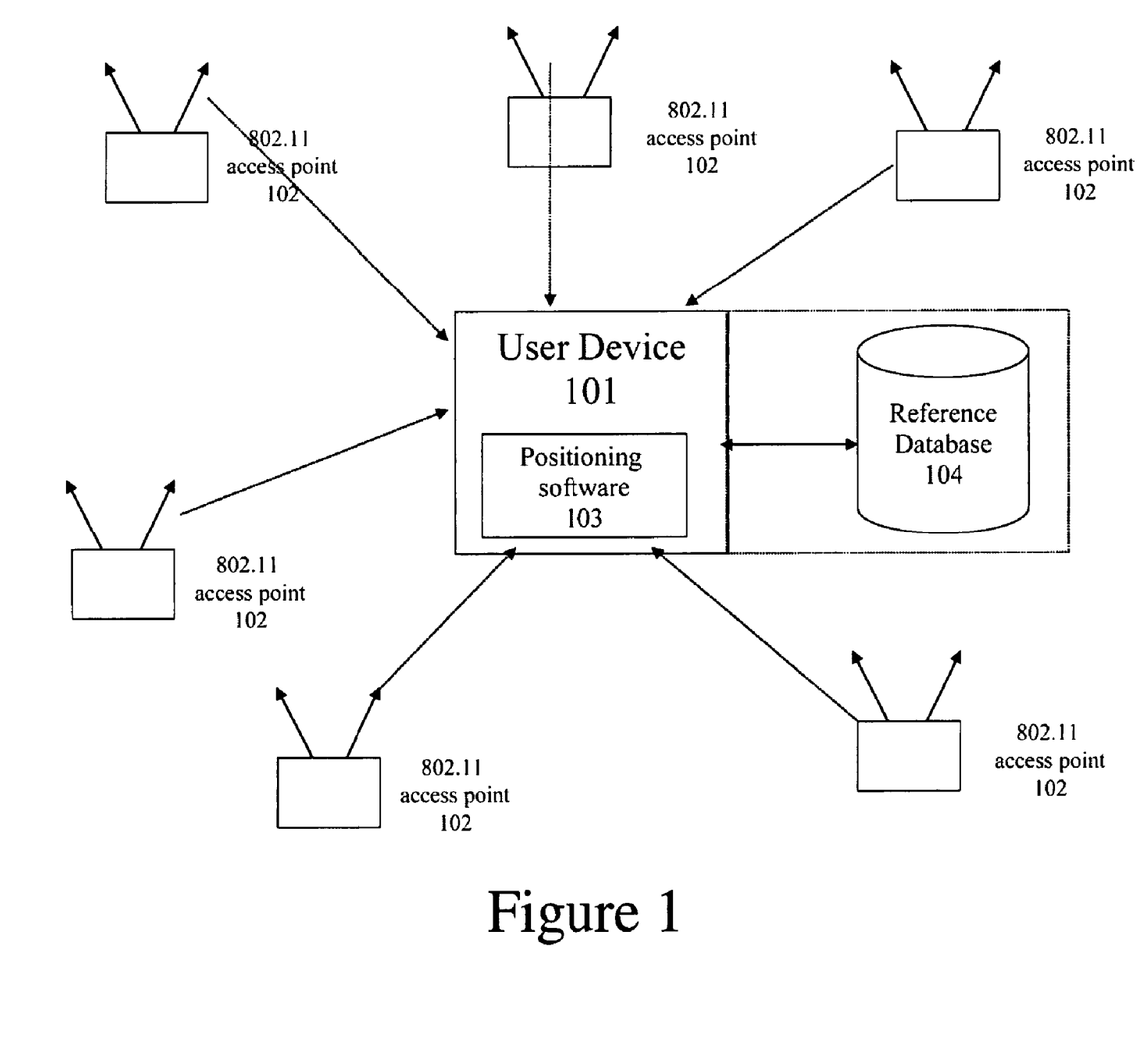
FIG. 1 depicts certain embodiments of a Wi-Fi positioning system.

FIG. 1 depicts a Wi-Fi positioning system (WPS). The positioning system includes positioning software [103] that resides on a computing device [101]. Throughout a particular coverage area there are fixed wireless access points [102] that broadcast information using control/common channel broadcast signals. The client device monitors the broadcast signal or requests its transmission via a probe request. Each access point contains a unique hardware identifier known as a MAC address. The client positioning software receives signal beacons from the 802.11 access points in range and calculates the geographic location of the computing device using characteristics from the signal beacons. Those characteristics include the unique identifier of the 802.11 access point, known as the MAC address, and the strengths of the signal reaching the client device. The client software compares the observed 802.11 access points with those in its reference database [104] of access points, which may or may not reside on the device as well. The reference database contains the calculated geographic locations and power profile of all the access points the gathering system has collected. The power profile may be generated from a collection of readings that represent the power of the signal from various locations. Using these known locations, the client software calculates the relative position of the user device [101] and determines its geographic coordinates in the form of latitude and longitude readings. Those readings are then fed to location-based applications such as friend finders, local search web sites, fleet management systems and E911 services.

SUMMARY

The invention provides methods and systems for classifying WLAN access points according to the quality of estimation of characteristics of the WLAN access points. The classifications may be used to scale a reference database and quantify an expected error of estimation of the characteristics of the WLAN access points. Under one aspect of the invention, WLAN access points are classified based on their impact on a user's position, speed of travel, and direction of travel estimation accuracy in a WLAN positioning system.

Under another aspect of the invention, a positioning system has a plurality of Wi-Fi access points in a target area. A method for determining a quality of estimation of characteristics of a Wi-Fi access point comprises a Wi-Fi enabled scanning device receiving and measuring a number of received signal strength (RSS) samples of the a Wi-Fi signal transmitted by the Wi-Fi access point. A total distance traveled by the Wi-Fi enabled scanning device while measuring the number of RSS samples is estimated. The quality of estimation of characteristics of the Wi-Fi access point is estimated using the total distance traveled by the Wi-Fi enabled scanning device.

Under another aspect of the invention, the characteristics of the Wi-Fi access point include at least one of geographic location of the Wi-Fi access point and radio propagation characteristics of the Wi-Fi access point.

Under another aspect of the invention, a positioning system has a plurality of Wi-Fi access points in a target area. A method for determining a quality of estimation of characteristics of a Wi-Fi access point comprises a Wi-Fi enabled scanning device receiving and measuring a number of received signal strength (RSS) samples of the Wi-Fi signal transmitted by the Wi-Fi access point. A corresponding speed of travel of the Wi-Fi enabled scanning device is associated with each RSS sample. A corresponding period of time of scanning is associated with each RSS sample. A confidence factor is determined using the sum of each of the speeds of travel of the Wi-Fi enabled scanning device weighted by the corresponding period of time of scanning for each RSS sample. The quality of estimation is determined using the confidence factor.

Under another aspect of the invention, a positioning system has a plurality of Wi-Fi access points in a target area. A method for determining a quality of estimation of characteristics of a Wi-Fi access point comprises a Wi-Fi enabled scanning device receiving and measuring a number of received signal strength (RSS) samples of the Wi-Fi signal transmitted by the Wi-Fi access point. A corresponding speed of travel of the Wi-Fi enabled scanning device is associated with each RSS sample. A corresponding period of time of scanning is associated with each RSS sample. A confidence factor is determined using the number of RSS samples and the speeds of travel of the Wi-Fi enabled scanning device weighted by the corresponding period of time of scanning for each RSS sample. The quality of estimation is determined using the confidence factor.

Under another aspect of the invention, a method for estimating the position of a Wi-Fi enabled device comprises identifying Wi-Fi access points within range of the Wi-Fi enabled device. Calculated locations and quality of estimation values corresponding to the identified Wi-Fi access points are retrieved from a reference database. The position of the Wi-Fi enabled device is estimated using the calculated locations and quality of estimation values.

Under another aspect of the invention, at least one quality of estimation value corresponding to a Wi-Fi access points determines a weight assigned to a calculated location of the corresponding Wi-Fi access point for use in estimating the position of the Wi-Fi enabled device.

Under another aspect of the invention, a calculated location corresponding to a Wi-Fi access points is not used in estimating the position of the Wi-Fi enabled device if a quality of estimation value corresponding to the Wi-Fi access point is below a threshold.

DETAILED DESCRIPTION

Embodiments of the invention provide methods and systems to define a quality metric for each WLAN access point (AP) in a WLAN based positioning system. The quality metric of a WLAN access point may be used as an indicator of the expected error of estimation of position, speed of travel, and direction of travel of a user based on that WLAN access point. Quantifying expected error of estimation based on a given WLAN access point can be used to increase the accuracy of overall estimation by giving more weight to more reliable WLAN access points, and it can also be used to quantify expected error of the final estimation of position, speed of travel and direction of travel by considering the quality of an aggregate of the WLAN access points in range.

Embodiments of the present invention build on techniques, systems and methods disclosed in earlier filed applications, including but not limited to U.S. patent application Ser. No. 11/261,848, entitled Location Beacon Database, U.S. patent application Ser. No. 11/261,898, entitled Server for Updating Location Beacon Database, U.S. patent application Ser. No. 11/261,987, entitled Method and System for Building a Location Beacon Database, and U.S. patent application Ser. No. 11/261,988, entitled Location-Based Services that Choose Location Algorithms Based on Number of Detected Access Points Within Range of User Device, all filed on Oct. 28, 2005, the contents of which are hereby incorporated by reference in its entirety. Those applications taught specific ways to gather high quality location data for Wi-Fi access points so that such data may be used in location based services to determine the geographic position of a Wi-Fi-enabled device utilizing such services and techniques of using said location data to estimate the position of a system user. The present techniques, however, are not limited to systems and methods disclosed in the incorporated patent applications. Thus, while reference to such systems and applications may be helpful, it is not believed necessary to understand the present embodiments or inventions.

Because the location of users in a WLAN positioning system are calculated with reference to the location of public and private WLAN access points, any inaccuracy in associated parameters of an access point (AP), for example the geographic location of access point, directly impacts the accuracy of position estimation of the users. Aspects of this invention include a systematic method to classify or quantify the quality of WLAN access points. Also, aspects of the invention can be used to scale a reference database of WLAN access points. Embodiments can be used to quantify the expected error of results of calculations using a given WLAN access point. WLAN access points may then be classified based on their level of accuracy. The knowledge of the accuracy level of the WLAN characteristics can be used, for example, in estimation equations to increase the accuracy of the estimation by using only relatively high quality access points or weighting access points based on their quality.

Characteristics of a WLAN access point, such as its geographic location or radio propagation characteristics, may be estimated by using a Wi-Fi enabled scanning device to collect Received Signal Strength (RSS) samples occurring at corresponding positions. For example, the techniques disclosed in the applications incorporated above may be used.

The total number of samples collected by the scanning device when collecting RSS samples for a given WLAN access point may be used to calculate the expected error of estimation of characteristics for that WLAN access point. The samples are weighted according to the speed of the scanning device when collecting RSS samples. The number of RSS samples weighted according to the speed of the scanning device at the time of RSS sampling may be used as a surrogate for the ratio of the number of samples to the coverage area of the an access point.

Figure 2:
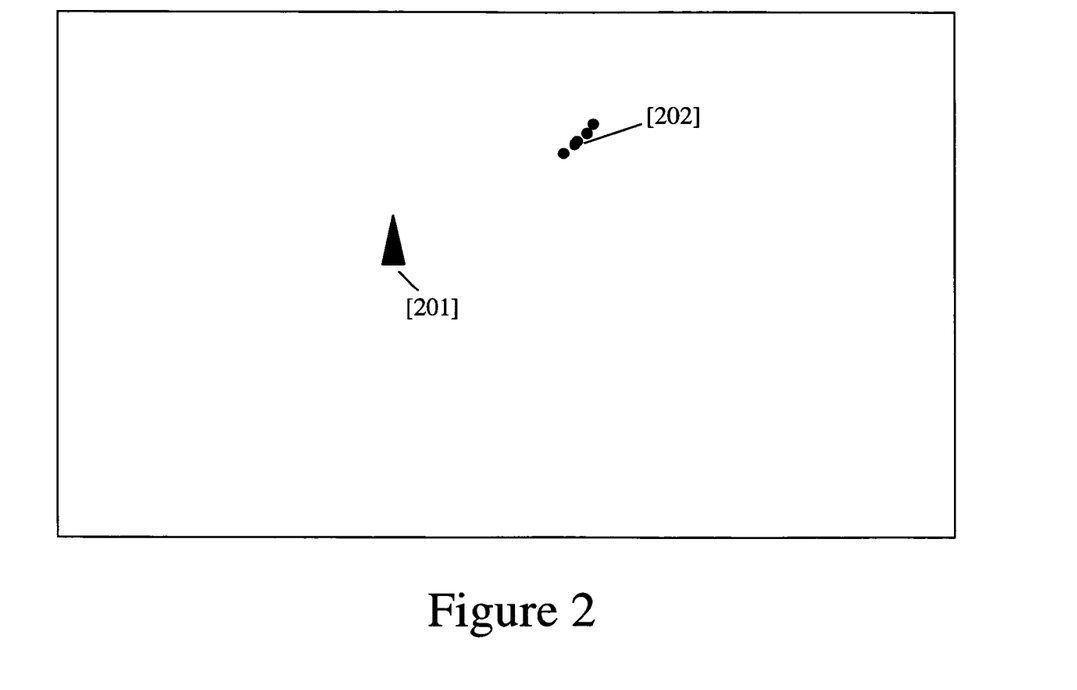
FIG. 2 depicts an example of an access point with a relatively small number of RSS samples.
Figure 3:
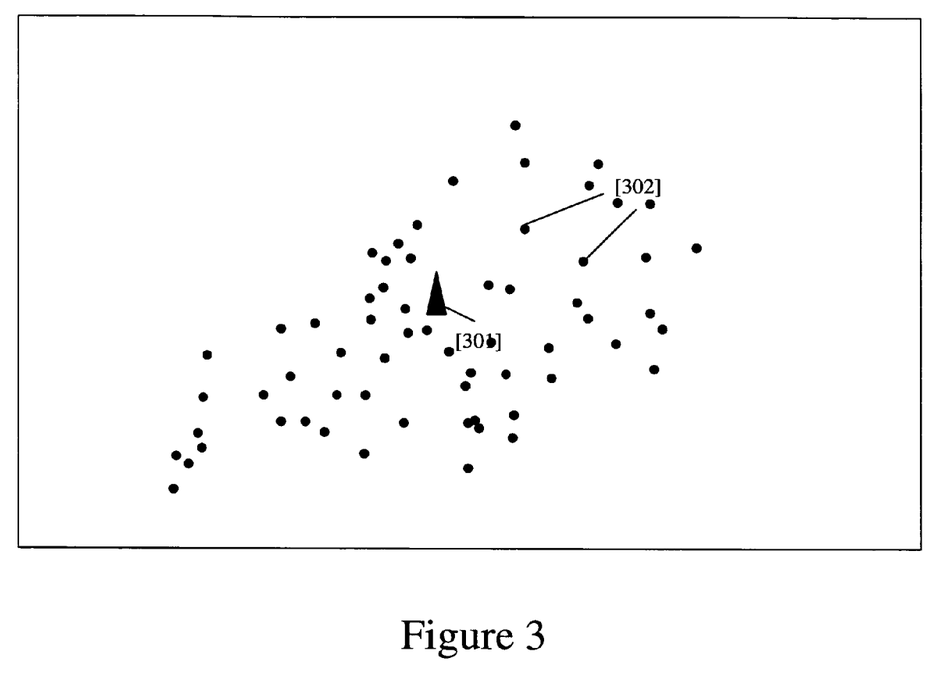
FIG. 3 depicts an example of an access point with a relatively large number of RSS samples.

FIG. 2 depicts an example of a WLAN access point [201] having a relatively low quality of characterization because the number of RSS samples [202] is relatively low. In contrast, FIG. 3 depicts an example of a WLAN access point [301] having a relatively high quality of characterization because the number of RSS samples [302] is relatively high, resulting in relatively high accuracy of estimation of WLAN access point characteristics.

Figure 4:
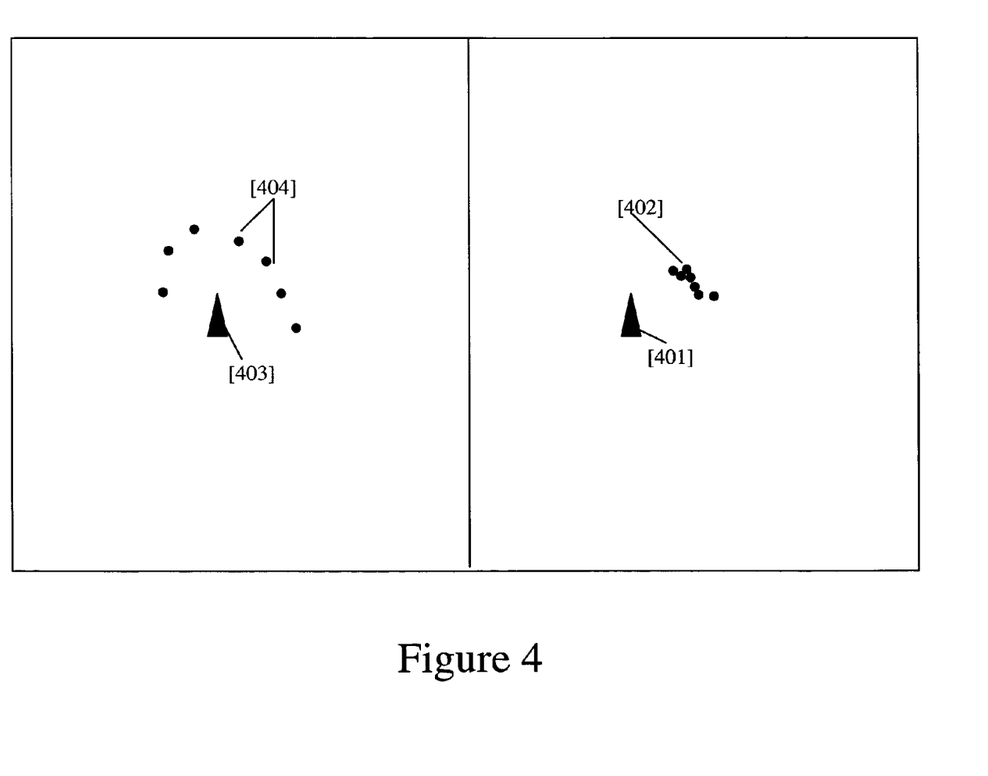
FIG. 4 depicts an example of the impact of total distance of travel of a Wi-Fi enabled scanning device on quality of estimation of WLAN access point characteristics.

FIG. 4 depicts the impact of the speed of the scanning device on the total distance traveled by the scanning device while collecting RSS samples, in which two WLAN access points [401] and [403] with equal numbers of RSS samples [402] and [404] are presented. During the collection of the RSS samples [404] for WLAN access point [403], the scanning device was traveling at a higher speed than when the scanning device was collecting RSS samples [402] for WLAN access point [401]. Where the RSS samples [402] and RSS samples [404] were collected over the same amount of time, the RSS samples [404] cover a greater total distance than the RSS samples [402]. Thus, the RSS samples [404] are a better indicator of the characteristics, for example the power profile, of the WLAN access point [403] as compared to WLAN access point [401].

Under other embodiments of the invention, the quality of estimation of characteristics of a WLAN access point is quantified. A WLAN access point's geographic location and its radio propagation characteristics are estimated based on the RSS samples in its coverage area. The number of RSS samples which are used for estimation of characteristics of an WLAN access point directly impacts the accuracy of estimation. If the number of RSS samples of a WLAN access point is relatively low, the error of estimation of geographic location of the WLAN access point and estimation of its radio propagation characteristics is relatively high. Therefore, WLAN access points with relatively small numbers of RSS samples can be considered to have relatively low reliability when used in a WLAN based positioning system. On the other hand, WLAN access points with relatively high numbers of RSS samples can be considered relatively high reliability WLAN access points. Under one example embodiment, the number of RSS samples can be used to quantify the expected accuracy of position estimation based on the WLAN access points. Since the expected accuracy of position estimation of different WLAN access points is different, the estimation based on them can also be weighted according to their expected error.

In the process of scanning, the speed of the scanning device is not constant. The scanning device might stop for a while or it might move fast along highways. As a result, the same number of RSS samples may cover different geographical areas, as explained in connection with FIG. 4 above. The geographical area that a given number of RSS samples covers is the speed of the scanning device times the period of scanning. Therefore, assuming a constant scanning period, the value of the absolute number of samples is weighted according to the speed of scanning device at time of scanning. The speed of the scanning device at the time of RSS sampling can be collected, for example, from a GPS or it can be derived from GPS position over time. The GPS velocity estimation is very accurate because it is based on Doppler frequency of measurement of the GPS received signal, but velocity calculation based on GPS position over time is a rough estimate of the velocity.

If the estimation of the speed of the scanning device at the time of scanning is known and the total number of scanned RSS samples is denoted by N, a confidence factor, denoted by CFn, is calculated as follows:

$$CFn = \sum_{i=1}^{N} f(V_i T_i)$$

in which $V_i$ is the speed of the scanning device and $T_i$ is the period of scanning at the time of taking RSS sample i, where $0 < i < N$. The period of scanning is a constant value almost all the time. The value of the period of scanning, when it is constant, is shown with $T_0$. The function $f(V_i T_i)$ is a nonlinear function and generally it is as follows: For RSS samples which are taken while the scanning device is moving, the $V_i T_i$ is considered as the weight of samples. For RSS samples which are taken while the scanning device is stationary, all the readings with the same location and the same power reading are considered once. For example, if the scanning device collects RSS power samples while not moving for a given period of time, Tp, and power reading from an access point was the same for the entire period Tp, only one RSS sample from this access point for the period Tp is considered. Finally, RSS samples taken while the scanning device is stationary are considered with a correction factor K. The correction factor K can be calculated based on the average acceleration of the scanning device from zero speed, $a_0$. Therefore, $K = a_0 T_0^2$.

After removing RSS samples with the same location and power reading (samples taken while the scanning device is stationary) N samples remain. Of the total number of samples N, if $N_1$ RSS samples are taken while the scanning device is stationary, and if $N_2$ RSS samples are taken while the scanning device is moving, the confidence factor can be written as follows:

$$CFn = KN_1 + \sum_{i=1}^{N_2} V_i T_i$$

One example of a confidence factor calculation having this form is as follows, if scanning period is set to one second:

$$CFn = 2N_1 + \sum_{i=1}^{N_2} V_i$$

The value of CFn calculated above is an indicator of the reliability of the estimation of characteristics of a WLAN access point. Interpretation of the CFn value is as follows. As stated above, a relatively small number of RSS samples will translate to almost no reliability of estimation, i.e., one or two samples are not enough for a reliable estimate. Increasing the number of RSS samples has an exponential effect on accuracy. In other words, one RSS sample difference at a low number of samples has a greater impact on accuracy than one RSS sample at a high number of samples. On the other hand, when the number of RSS samples is relatively high, the quality of estimation based on them is high. Further increasing the number of RSS samples does not have a noticeable impact on the accuracy of estimation of characteristics, such as geographic location and radio propagation characteristics, of a WLAN access point. Therefore, as part of a WLAN access point reliability calculation, there will be two thresholds: $CF_{min}$ is a minimum number of samples, on average, that are needed to determine a relatively reliable WLAN access point characteristic estimation. If the number of RSS samples is below this threshold, the estimation is considered unreliable. $CF_{max}$ is a threshold beyond which adding extra RSS samples does not have a significant impact on the accuracy of the estimations.

Since the relationship between confidence factor, CFn, and a reliability measure, R, of WLAN access point characteristics is logarithmic, the reliability is calculated as follows:

$$R = (R_{max} - R_{min}) \frac{[\log(CF_n) - \log(CF_{min})]}{[\log(CF_{max}) - \log(CF_{min})]} + R_{min}$$

The maximum reliability can be set to one, and the minimum reliability can be set to a very small number. For example, $R_{min}=0.001$,
$R_{max}=1$.

The values of $CF_{min}$ and $CF_{max}$ can be found empirically. Useful values for a general metropolitan WLAN based positioning system are as follows:

$CF_{min}=36$,
$CF_{max}=68$.

According to embodiments of the invention, the reference database [104] can be scaled according to the classifications of the WLAN access points, the quantification of expected error of access point parameters, or quality of associated WLAN access point data. For example, WLAN access points having a classification or quality measure below a desired threshold may be withheld from the reference database [104]. This ensures that only access points having a relatively high quality of parameter estimation are used by user device [101] in determining a user's position, speed of travel, or direction of travel. In other embodiments, all WLAN access points may be included in reference database [104], but the positioning software [103] may not use access points having a classification or quality measure below a desired threshold.

According to an embodiment of the invention, another example of scaling the reference database [104] includes finding a reliability factor for each WLAN access point in the positioning system, and logged it in reference database [104]. In a WLAN based positioning system, the user has access to the reference database [104] and uses the WLAN access points in range to estimate its position, speed of travel, and direction of travel. The reliability factor of each WLAN access point in the reference database [104] is used to weight the estimation results of the WLAN access points in range of the user. The use of the reliability factors is independent of the positioning algorithm, which is used to estimate the user's attributes, e.g., position, speed of travel, and direction of travel. If estimation in the most general form can be written as an operation $O$ on function $f$ over WLAN access points $AP_N$ in range, $O(f(AP_1), \ldots, f(AP_N))$, the reliability factor is applied to the estimation as follows:

$O(R_1 f(AP_1), \ldots, R_N f(AP_N))$

Where N is the total number of access points in range of the user.

WLAN access points with different reliability factors or quality metrics can be combined in different methods. For example, all WLAN access points can be used to estimate the position of a user, but each WLAN access point is weighted according to its reliability factor. One example is multiplying the estimation results of each WLAN access point by its reliability, and then combining all results to get the final estimation result. Another example is to use only the relatively high quality WLAN access points. In this case, WLAN access points are classified based on their reliability. After detecting all WLAN access points in range, the method starts the estimation process with the WLAN access points in the highest reliability class. Based on the number of WLAN access points in the highest class, a decision is made to either include or exclude WLAN access points in the lower classes. Deciding which of these two example methods to use depends on the use case, as does the decision to include or exclude lower class WLAN access points.

Another dimension that can be added to the CFn calculation is the accuracy of the location of RSS samples. The location of RSS samples may be determined, for example, by a GPS attached to the scanning device. A GPS reports expected Position Error (PE) indicators. The expected Position Error of the GPS location estimations can be used to weight RSS samples as well. Higher weight is given to RSS samples with smaller expected PE values.

It will be appreciated that the scope of the present invention is not limited to the above-described embodiments, but rather is defined by the appended claims, and these claims will encompass modifications of and improvements to what has been described.

What is claimed is:

1. In a positioning system having a plurality of Wi-Fi access points in a target area, a method for determining a quality of estimation of characteristics of a Wi-Fi access point, the method comprising:

a Wi-Fi enabled scanning device receiving and measuring a number of received signal strength (RSS) samples of a Wi-Fi signal transmitted by the Wi-Fi access point;

estimating a total distance traveled by the Wi-Fi enabled scanning device while measuring the number of RSS samples;

using the estimated total distance traveled to calculate the quality of estimation of characteristics of the Wi-Fi access point;
associating a corresponding speed of travel of the Wi-Fi enabled scanning device with each RSS sample;
associating a corresponding period of time of scanning with each RSS sample;
determining a confidence factor, $CF_n$, using the sum of each of the speeds of travel of the Wi-Fi enabled scanning device weighted by the corresponding period of time of scanning for each RSS sample; and
determining the quality of estimation, R, according to the equation:

$$R = (R_{max} - R_{min})\frac{[\log(CF_n) - \log(CF_{min})]}{[\log(CF_{max}) - \log(CF_{min})]} + R_{min}$$

wherein:
$R_{max}$ is a maximum quality of estimation;
$R_{min}$ is a minimum quality of estimation;
$CF_{max}$ is a maximum confidence factor; and
$CF_{min}$ is a minimum confidence factor.

2. The method of claim 1, wherein:
$CF_{max}$ is about 68; and
$CF_{min}$ is about 36.

3. In a positioning system having a plurality of Wi-Fi access points in a target area, a method for determining a quality of estimation of characteristics of a Wi-Fi access point, the method comprising:
a Wi-Fi enabled scanning device receiving and measuring a number of received signal strength (RSS) samples of a Wi-Fi signal transmitted by the Wi-Fi access point;
estimating a total distance traveled by the Wi-Fi enabled scanning device while measuring the number of RSS samples;
using the estimated total distance traveled to calculate the quality of estimation of characteristics of the Wi-Fi access point;
associating a corresponding speed of travel of the Wi-Fi enabled scanning device with each RSS sample;
associating a corresponding period of time of scanning with each RSS sample;
determining a confidence factor, $CF_n$, according to the equation:

$$CFn = KN_1 + \sum_{i=1}^{N_2} V_i T_i$$

wherein:
K is a correction factor;
$N_1$ is a subset of the RSS samples taken while the Wi-Fi enabled scanning device is stationary;
$N_2$ is a subset of the RSS samples taken while the Wi-Fi enabled scanning device is moving;
$V_i$ is one of the speeds of travel of the Wi-Fi enabled scanning device corresponding to RSS sample i; and
$T_i$ is one of the periods of time of scanning corresponding to RSS sample i; and determining the quality of estimation, R, according to the equation:

$$R = (R_{max} - R_{min})\frac{[\log(CF_n) - \log(CF_{min})]}{[\log(CF_{max}) - \log(CF_{min})]} + R_{min}$$

wherein:
$R_{max}$ is a maximum quality of estimation;
$R_{min}$ is a minimum quality of estimation;
$CF_{max}$ is a maximum confidence factor; and
$CF_{min}$ is a minimum confidence factor.

4. The method of claim 3, wherein:
$CF_{max}$ is about 68;
$CF_{min}$ is about 36;
K is about 2; and
$T_i$ is about 1 second.

* * * * *